United States Patent
Piepers et al.

[15] 3,646,994
[45] Mar. 7, 1972

[54] SPACER GRID RESPECTIVELY PLATE SPRING FOR A BUNCH OF CYLINDRICAL ELEMENTS TAKING PART IN A HEAT-EXCHANGING PROCESS

[72] Inventors: Gijsbrect G. Piepers, Heiloo; Leonard H. Vons; Aart Van Der Linde, both of, Alkmaar; Edvard Lijbrink, Bergen N. H., all of Netherlands

[73] Assignee: Reactor Centrum Nederland, The Hague, Netherlands

[22] Filed: Dec. 23, 1969

[21] Appl. No.: 887,801

[52] U.S. Cl. .................................................. 165/69, 165/162
[51] Int. Cl. ............................................................. F28f 7/00
[58] Field of Search .................................................. 165/162, 69

[56] References Cited

UNITED STATES PATENTS

| 3,176,762 | 4/1965 | Greenwood et al | 165/162 |
| 2,861,782 | 11/1958 | Swartz | 165/69 |

*Primary Examiner*—Charles Sukalo
*Attorney*—Cushman, Darby & Cushman

[57] ABSTRACT

A spacer grid for holding against lateral displacement a plurality of nuclear reactor fuel rods of heat exchange tubes includes means defining a plurality of side-by-side parallel compartments, each compartment being provided with a specially shaped arched spring plate which engages the fuel element or heat exchanger tube. The spring plates are so contoured and apertured as to provide passages for the flow of heat exchange fluid to thereby avoid stagnation of the fluid.

10 Claims, 21 Drawing Figures

(III-III)

(IV-IV)

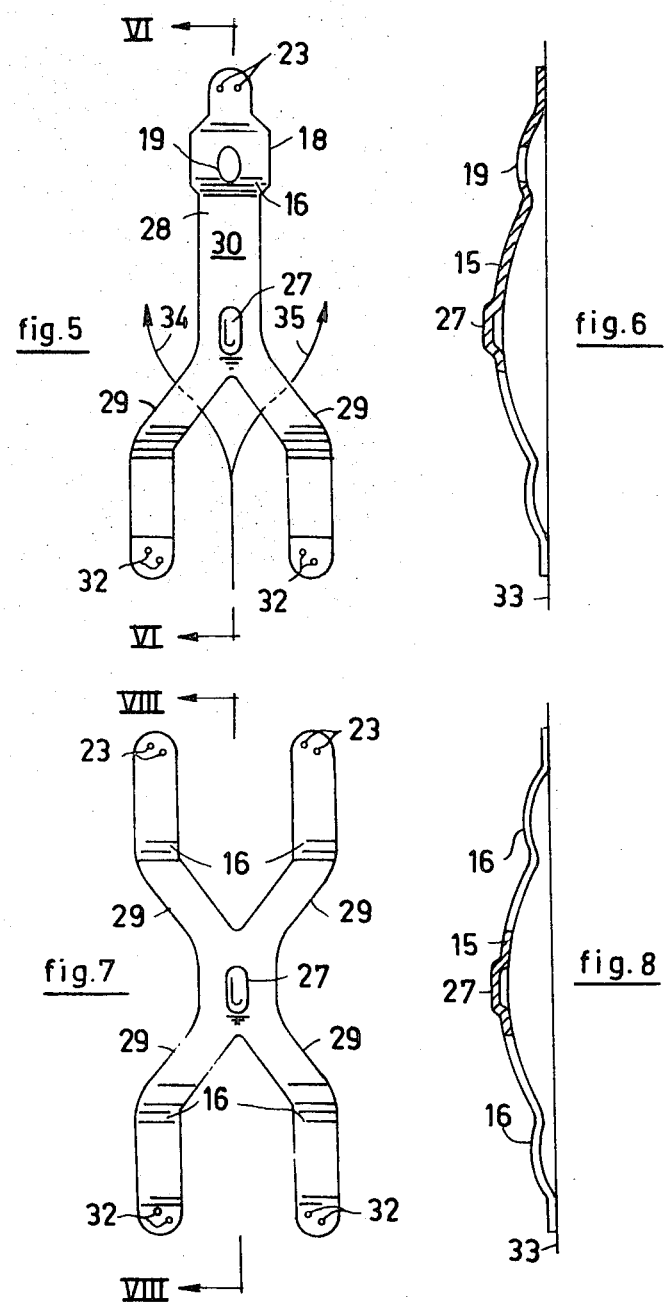

Figure 11:
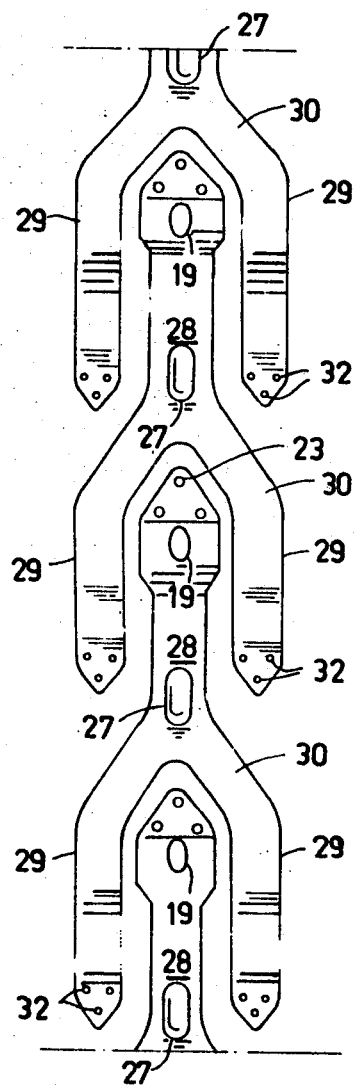

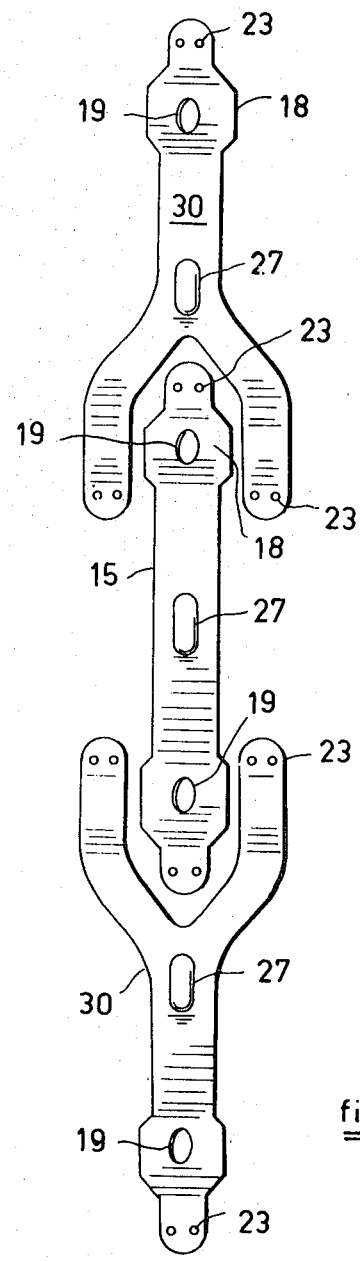
fig.11ª

Figure 12:
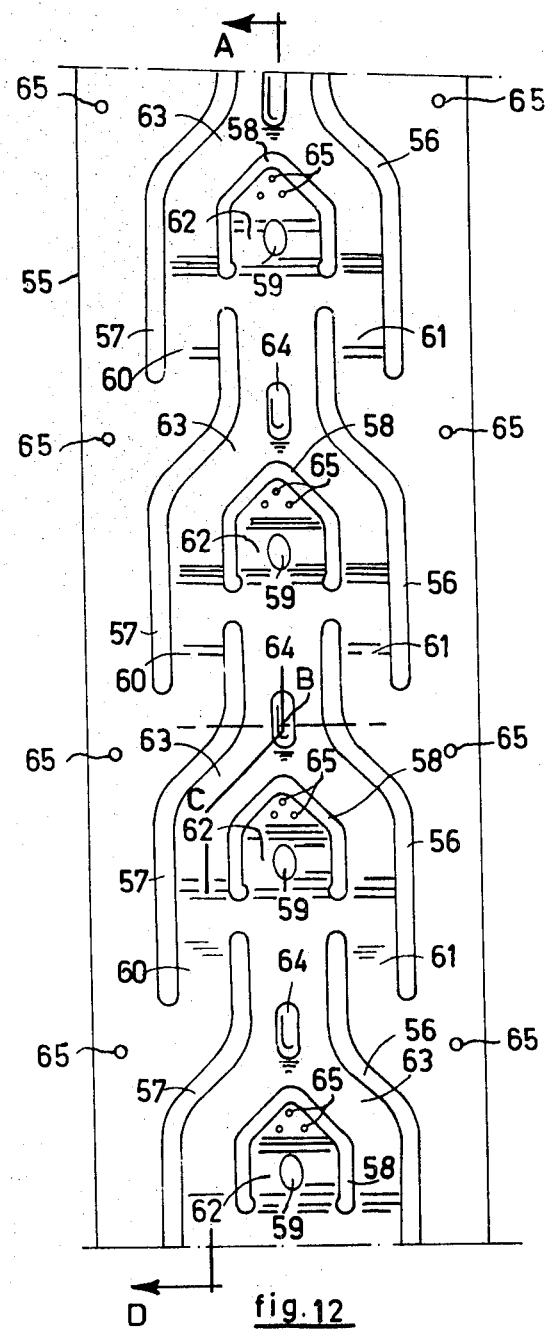
Figure 14:
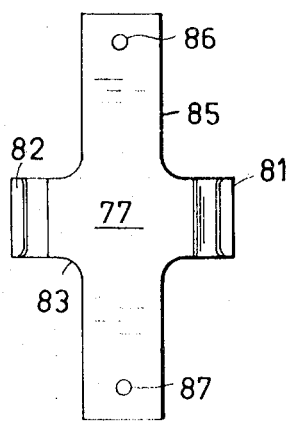

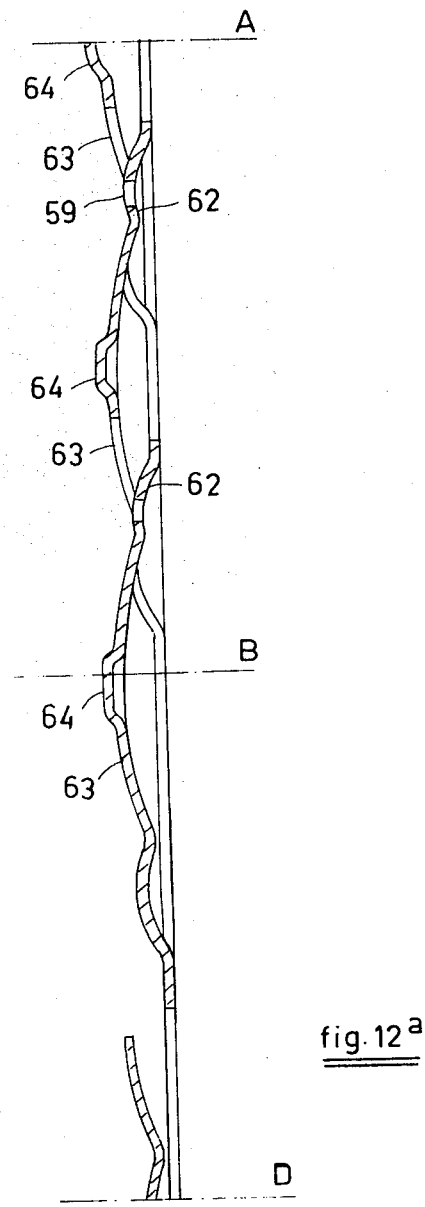
fig. 12ᵃ fig.14ᵃ

Figure 15:
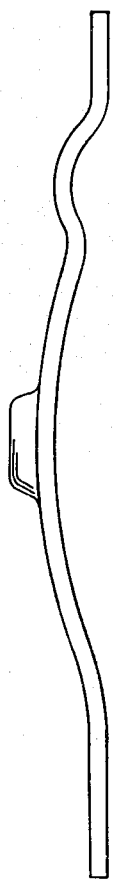

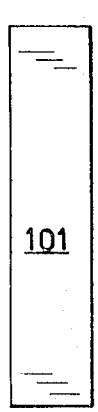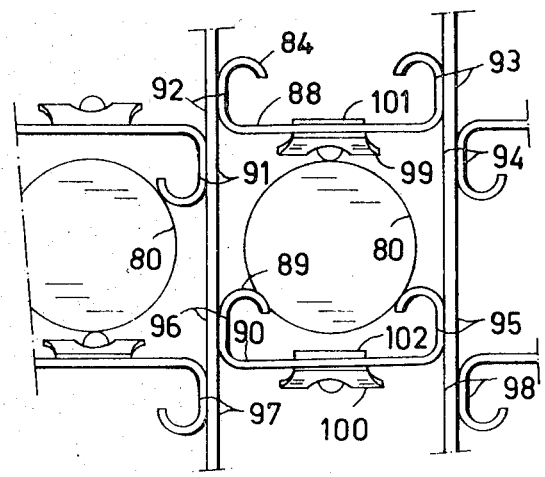
fig.16  fig.15
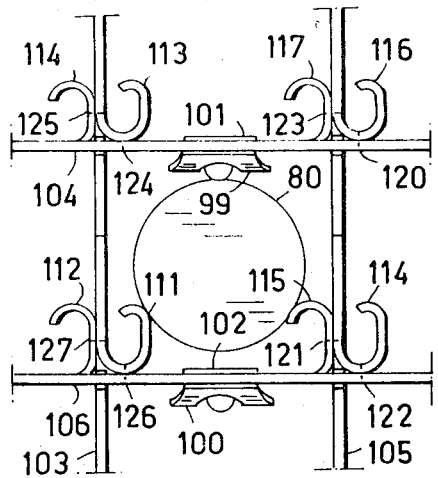
fig.17

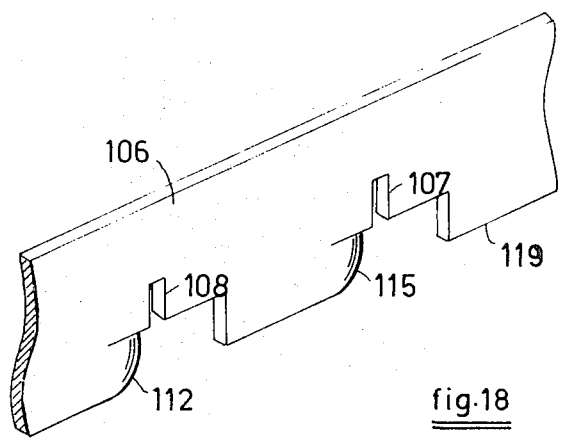
fig.18
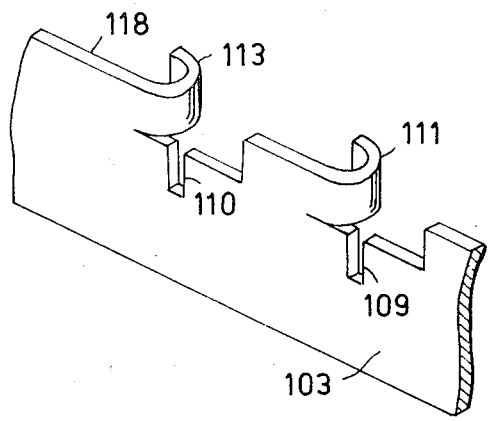

SPACER GRID RESPECTIVELY PLATE SPRING FOR A BUNCH OF CYLINDRICAL ELEMENTS TAKING PART IN A HEAT-EXCHANGING PROCESS

The invention relates to a supporting latice or spacer grid for giving sideways support to a bundle of preferably cylindrical elements which take part in a heat-exchanging process, which supporting lattice is assembled from band material so as to form a number of compartments. It is an object of the invention to provide a grid of this type, the construction being such that a plate spring is incorporated at least at one position in a side wall of such a compartment, which plate spring extends in two directions and, when in the released state, has a bow-shaped curve in one direction in its major middle-part, the extreme ends of the said plate spring being in rigid connection with fixing points in the said sidewall, whilst between these fixing points and near at least one end of the plate spring a smaller part is similarly arched in the form of a plate spring.

The said cylindrical elements may consist, for instance, of pins or rods of fissile material of breeding material to be placed in the core of a nuclear reactor. The same construction, however, may also be applied to a heat exchanger. In that case the cylindrical elements are formed by pipes around which flows one of the media to be cooled or heated. Lastly, it is also possible for electrical heating elements to be incorporated in the interior of the cylindrical elements.

The said plate springs have a nonlinear spring characteristic. Dependently of the mutual dimentional relationships of the curved parts of the springs, the pressing force increases with the degree of compression, remains constant over a certain range or decreases. As a result of this, it is possible within certain limits to press all the cylindrical elements with an identical force, quite independently of manufacturing and assembling tolerances and of temperature effects. This is of particularly importance in cases where the pressing force and spring tensions may not exceed certain maximum permissible values. It is not necessary to give the plate spring a lengthwise symmetrical form. So it is quite possible to use a plate spring with only one arched part, next to the bow-shaped part. In this form the plate spring will be shorter, while the flow around the spring benefits from it.

With a construction of the above-mentioned kind it important to assure that in practice there is no occasional stagnation of the cooling medium which flows lengthwise along the cylindrical elements on the outer side. This might be due to the fact that the plate spring used, when in the compressed state, constitutes an obstruction to the flow of cooling medium. Especially below the end or the ends of the plate spring which is or are arched in form, cavities in which practically no flow occurs are formed when the spring is in the tensioned state. This may result in the occurrence of local overheating not only of the ends of the plate spring itself, but, in the case of a nuclear reactor, also of the parts of the fuel rods which are situated next to them.

As the latter already have to withstand a high thermal load, any additional overheating will as a rule be disastrous. According to another object of the invention, stagnation of the cooling medium can be avoided, resulting in an improvement of the cooling, by providing the plate spring with at least one passage aperture transverse to the surface of the sidewall. Owing to these apertures, the flow of cooling medium can penetrate at one end of the plate spring below the space demarcated by the arched parts of the plate spring, whilst at the other end of the spring the mediumflow can pass out of this space through the passage aperture provided at this point. The cooling flow passing along the spring is thus guaranteed by the provision of these passage apertures, thus obviating the danger of local overheating.

According to a still further object of the invention, at least one end of each plate spring is constructed with a branching.

This branching may originate from the part of the spring that has a bow-shaped curve. The branching may, however, also begin between the transition of the curved part and the arched part. Both forms of branching produce a high-cooling effect. This may be accounted for by the fact that in the first place the branched spring is subdivided into two narrow spring parts which are easier of access for the cooling medium flowing along them. Moreover, the branched parts of the spring are positioned at an angle with each other, which likewise tends to have the effect that the flow of cooling medium moving parallel to the cylindrical elements will cross the said parts of the spring and hence cool them more effectively.

The branch also has the effect that the ends of the spring are laterally displaced. The result of this is that the arched parts are no longer situated so close to the surface of the cylindrical element. The part of the spring that has the greatest curvature, i.e., the part in which stagnation of the cooling flow could most easily occur, thus comes to be situated at a wider flow channel where stagnation will no longer occur.

It is also possible to direct the branched ends towards the middle of the bow-shaped part. According to this construction the spring is folded back into itself. An additional advantage is the fact that for the same spring force it is now possible to reduce the breadth of the lattice.

By hollowing out the passage aperture between the points of branching the possibility is afforded of giving this passage aperture very ample dimensions, so that the cooling medium flowing through it into the arched spaces of the spring forms a very large part of the total flow of medium moving along the cylindrical elements. In many cases the passage apertures will be constructed in the form of a perforation of a locally widened section of the arched end of the spring. Thanks to this local widening, the distribution of tension in the plate spring is not adversely affected by the perforation provided.

In the case of the plate spring that is endwise folded back onto itself, it is likewise possible to hollow out the passage aperture between the points of branching by providing the existing slots between the curved middle-part of the spring and its arched plate-spring end parts with an opening at the end whose transverse dimension is larger than that of the slot. By giving this opening a rounded form, the further result is obtained that the stress concentration at this spot is reduced.

With this form of construction the plate spring has a T-shaped form at its two ends. The transverse beam of this T provides a good path for the inflow of cooling medium, since this part protrudes like a knife blade into the flowpath and allows the medium to flow away along the parts of the spring on the two sides.

In order that the flow on the outer side of the major arch-shaped middle-part may be able to flow along this part also, a partial bulge is provided in the middle of the curved part of the plate spring, in the direction of the cylindrical element resting against it. The bulged part serves as a spacer by means of which room is formed on the outer side of the plate spring along which the flow of cooling medium can enter.

According to a preferred embodiment there are strips rigidly fixed in a sidewall at least at two other positions on this wall. These strips themselves have in the middle a part that is bulged in the direction of the cylindrical element resting against it. Thanks to this measure only one spring of the kind described is needed for each compartment, so that a saving in costs can be effected on the number of springs.

For applications in connection with heat exchangers or nuclear reactors operating at high temperatures, e.g., about 600° C., as occurs in the case of cooling with liquid sodium, some other special measures have to be taken. According to these measures, the cylindrical elements are supported over a larger part of their length by a number of plate springs joining up in sequence closely with each other.

As a result of this increased number of springs per unit length of the cylindrical element, the force exerted per spring may be kept low. In this way it is possible to limit also the spring tension to the permissible value which is consistent with the high working temperature.

In one embodiment the plate springs with a single-sided branch are connected in such a way that the unbranched part of a subsequent plate spring is situated between the branched parts of a preceding plate spring.

A second embodiment consists in mounting an unbranched plate spring alternately with a plate spring having a double-sided branch, so that the ends of the unbranched plate spring come to lie between the branched ends of preceding and subsequent plate springs.

According to a third embodiment the plate springs that are folded back onto themselves are caused to join up with each other in close succession.

For the above-mentioned embodiments a reduction of the manufacturing and assembling costs may be obtained by punching out the individual plate springs from one metal strip in such a manner that the springs form a coherent assembly in the strip. The plate springs are thus wholly combined into an integral assembly in one single strip.

These spring strips lend themselves excellently for mass production. The lengths required may be obtained by cutting off according to need.

In the applications described in the foregoing for high-operating temperatures each preceding spring sets up an intensified turbulance in the current of cooling medium flowing along it, which has a good cooling effect upon a plate spring placed after it in the direction of flow.

Figure 1:
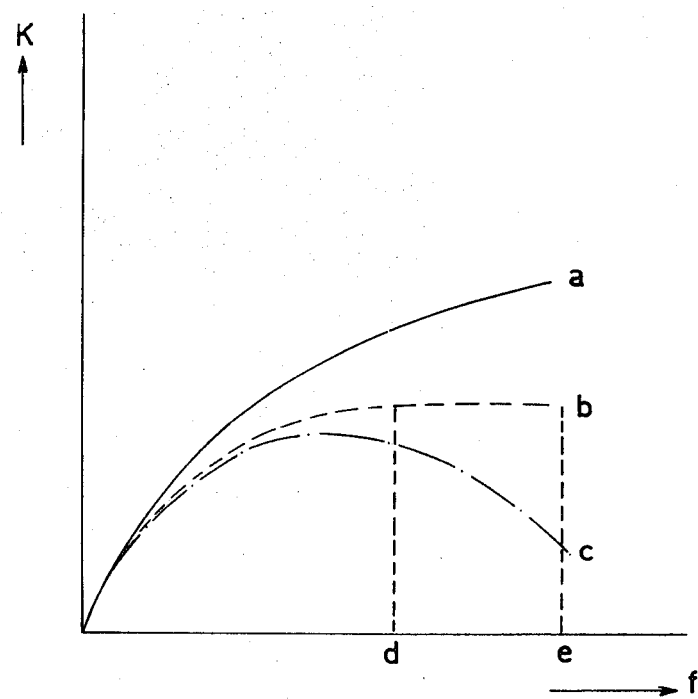

Thanks to the horizontal or negative gradient of the spring characteristic, described more in detail hereafter in relation to FIG. 1, the invention is ideally adapted for suppressing unwanted pipe vibrations.

It is a further object of the invention to supply a simple, inexpensive lateral support for nuclear fuel rod assemblies employing a square array of the fuel rods or pins.

It is still further object of the present invention to supply a practicable solution for the fabrication of lateral support giving spacer grids, in which zircaloy as grid material, in a reliable way is spotwelded to a spring material. Another object of the present invention is to provide an inexpensive spacer grid of the egg-crate type, in which the plate springs are having a reenforced base, giving an added reliability for a lasting spring resilience.

A number of typical embodiments are described in detail below on the basis of each of the undermentioned figures.

Figure 2:
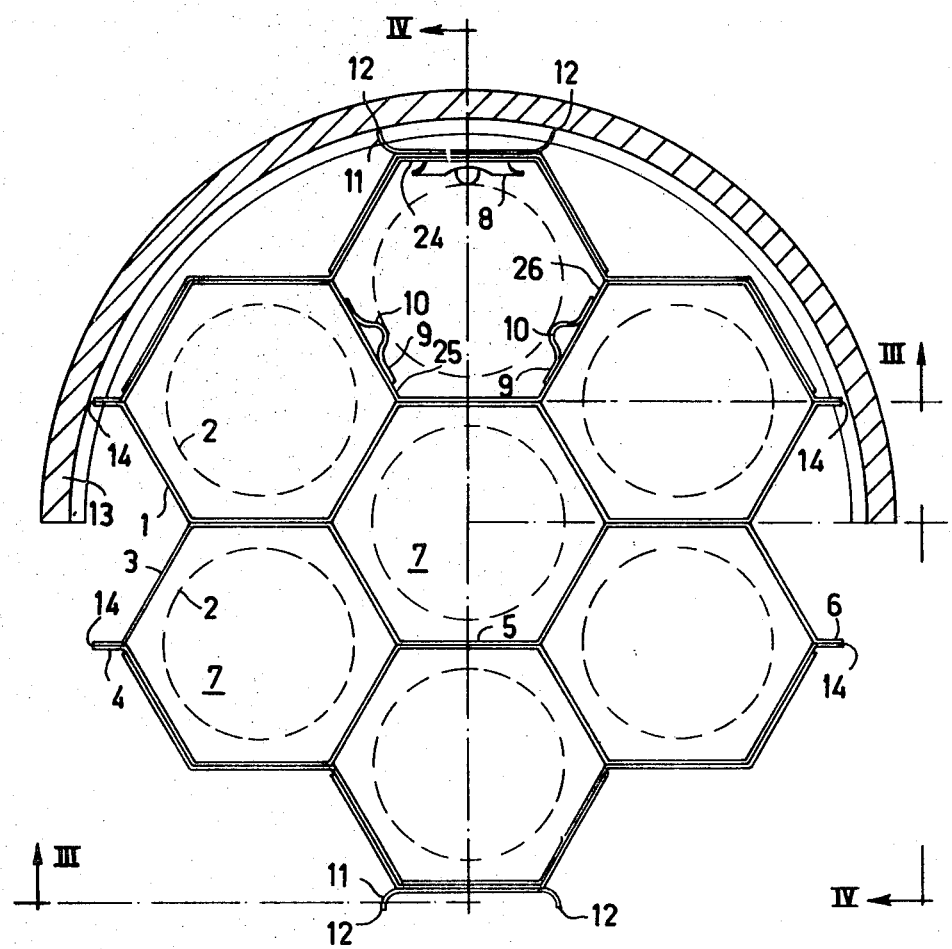
Figure 3:
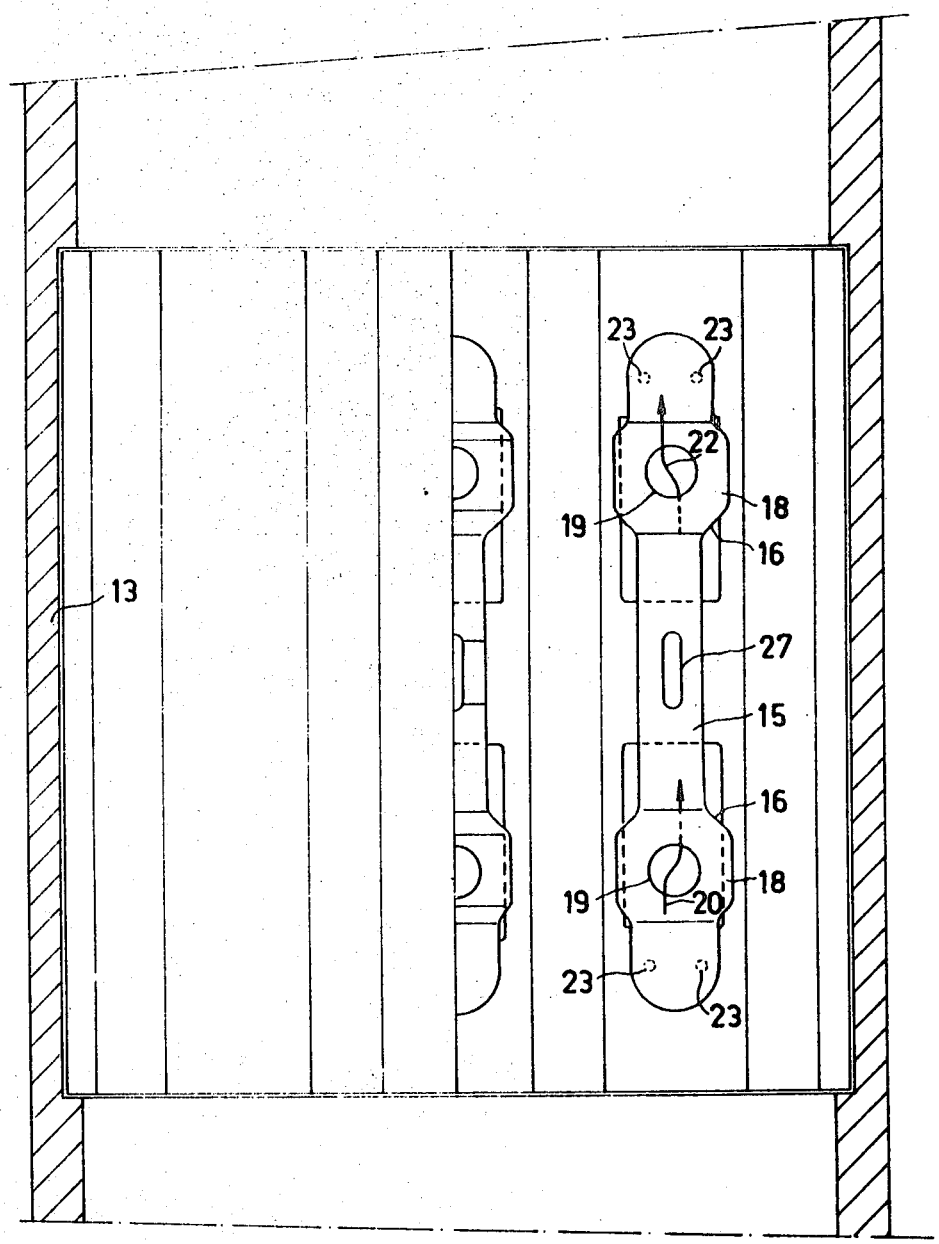
Figure 4:
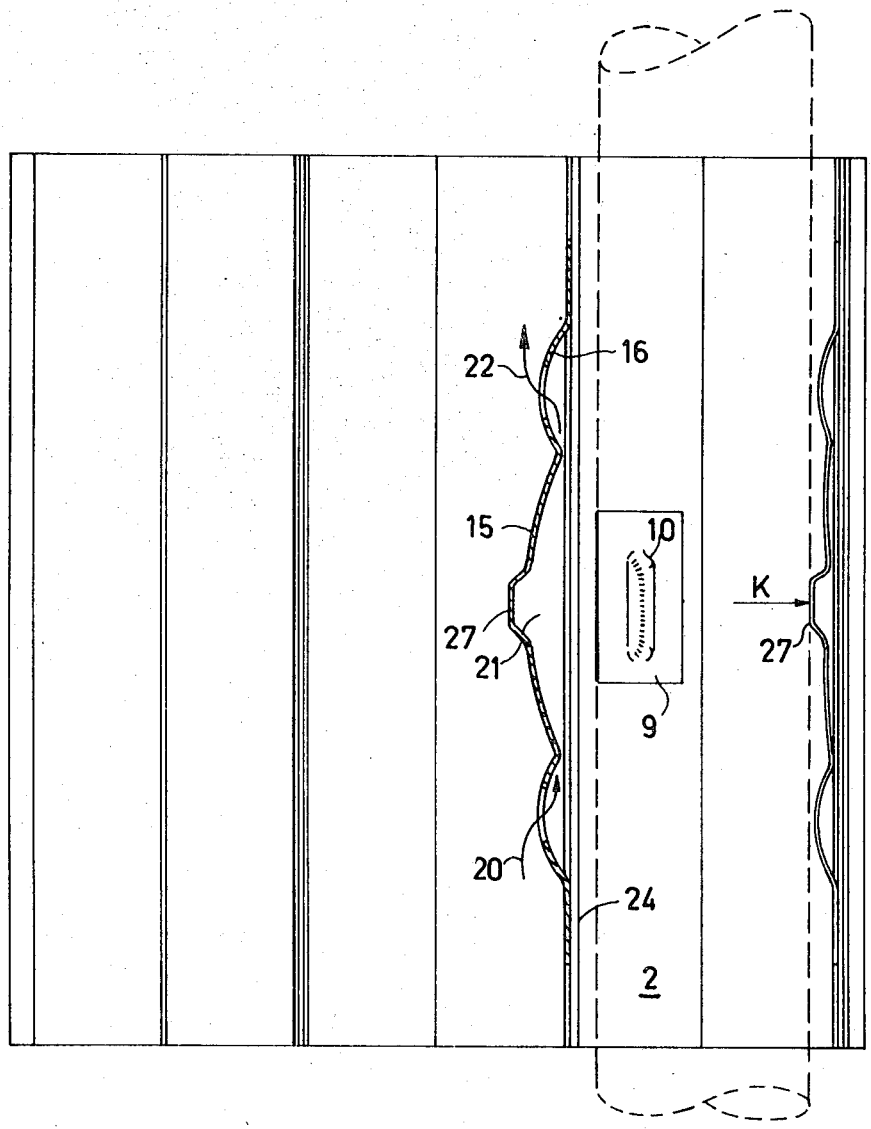
Figures 9, 10:
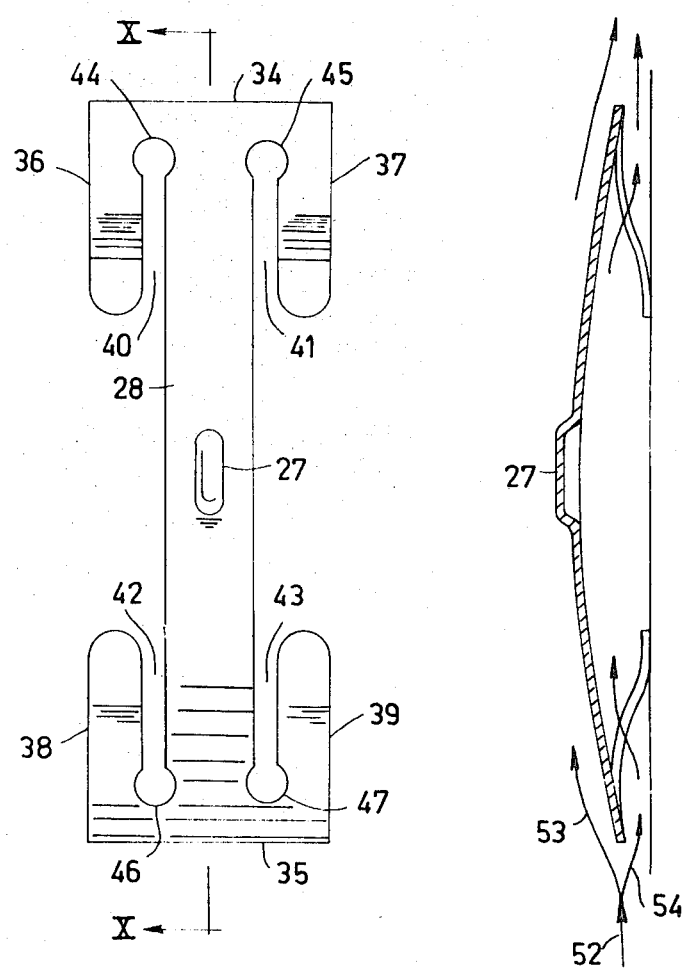
Figure 13:
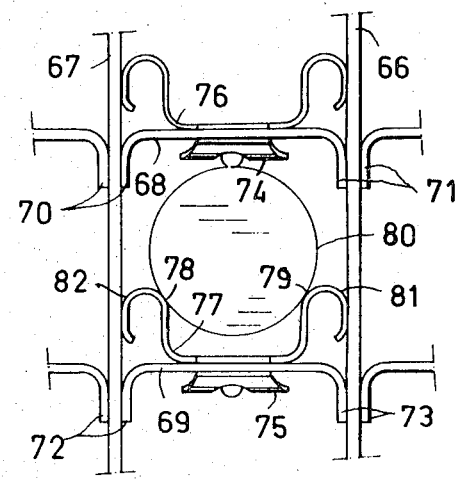

These figures represent in:

FIG. 1 : three spring characteristics;
FIG. 2 : a top-plan view of a spacer grid;
FIG. 3 : a longitudinal section of the spacer grid of FIG. 2;
FIG. 4 : a longitudinal section of the plate spring of FIG. 2;
FIG. 5 : a view of a plate spring constructed with a single-sided branch;
FIG. 6 : a longitudinal section of the plate spring of FIG. 5;
FIG. 7 : a double-sidedly branched plate spring in elevation;
FIG. 8 : a longitudinal section of the plate spring of FIG. 7;
FIG. 9 : a view of a plate spring whose branched ends are bent back towards the middle;
FIG. 10 : a longitudinal section of the plate spring of FIG. 9;
FIG. 11 : a series of plate springs of the type represented in FIG. 5 and FIG. 6;
FIG. 11a; a-series of alternating plate springs of the types represented in FIG. 3 and FIG. 5;
FIG. 12 : a spring strip as a variant of FIG. 11;
FIG. 12a : a longitudinal sectional view of FIG. 12;
FIG. 13 : a top plan view of a spacer grid suitable for a square array of fuel rods;
FIG. 14 : a front view of the crosslike rod support element;
FIG. 14a : a side view of an asymmetrical plate spring;
FIG. 15 : a modification of the spacer grid shown in FIG. 13;
FIG. 16 : a front view of the counterplate used in FIG. 15;
FIG. 17 : a second modification of a square array spacer grid in top view;
FIG. 18 : a detail view of the strap interlocking means of FIG. 17;

FIG. 1 shows the spring characteristics that can be achieved with plate springs of the type described.

The force K by means of which the plate spring is compressed, is plotted along the vertical axis (see also FIG. 4).

The spring compression $f$ is represented along the horizontal axis. The spring compression is measured in the middle 27 of the plate spring (see FIG. 4).

Especially the characteristics $b$ and $c$ are extremely important for the purpose in view. Characteristic $b$ shows a trend which guarantees a constant spring force K between the limits $d$ and $e$.

Characteristic $c$ shows, that with increasing compression it is even possible to make the spring force K diminish. Springs with this characteristic (along with springs with characteristic $b$) are suitable for counteracting the vibration of pipes or fuel rods or pins. Such vibrations, which may be set up by pressure fluctuations in the flow of cooling medium have so far proved very troublesome, as they may result in fatigue fractures.

FIG. 2 shows, in a top-plan view of a supporting lattice 1, how a number of fuel rods 2 are supported in this lattice. The lattice is made up of a number of bands 3, bent zigzag, which are rigidly connected at positions 4, 5 and 6 where neighboring zigzag bands rest against each other. In this way a number of lattice compartments 7 are formed, in one of which it is shown in detail how the fuel rods 2 are supported by a plate spring 8, along with two strips 9 each having a bulge 10. The supporting lattice represented in the figure is provided on two sides with spacers 11 bent to a strip-shape, which rest with their ends 12 against tube 13 in which the fissile element, comprising fuel rods 2 is contained. At four other positions the lattice stems with its ends 14 against the inner side of the said tube 13.

FIG. 3 shows, in a longitudinal section of the fissile element of FIG. 2, how the plate springs used are designed. According to the view of the spring as given in FIG. 2, each plate spring is provided with a bow-shaped middle-part 15 which merges at its two ends into smaller plate spring parts 16 arched in a similar way as part 15.

Parts 16 have in the middle a broadened section 18. Positioned in the middle of this broadened section is a perforation 19 enabling the cooling medium to flow along the fuel rods 2 towards, for example, the underside via 20, and afterwards to pass out of space 21 on the top side by path 22. At positions 23 each end of the plate spring is rigidly fixed by means of, for instance, a spot-weld, to a sidewall component 24 of a compartment 7.

The foregoing is illustrated once more for the sake of clarity in FIG. 4 in a longitudinal section of the said plate spring. Here, too, it can be seen that the middle of the major middle-part of the spring is provided with a bulge 27 which comes to rest against the nearby surface of fuel rods 2. At the right-hand spring the force K is indicated by means of which this spring is compressed.

A similar fuel element is supported in one compartment 7 of a supporting lattice 1, preferably by a plate spring 8 and to strips 9 with bulges 10.

FIG. 5 represents a variant in which one of the ends of spring 30 is constructed with a branch in the bow-shaped part. Whereas the top 28 of the bow-shaped part is unbranched, the bottom part is branched into two spring parts 29. Each spring part 29 is of practically half the breadth of a spring part 28. The spring part 28 is in turn constructed with a broadened section 18 near its end, in which section a perforation 19 is provided. The numerals 32 and 23 indicate the positions at which the spring ends are welded to the sidewall 33 of the supporting lattice. The flow of cooling medium can in this case move by way of the flow arrows 34 en 35, whilst the flow through aperture 19 continues in the same manner as already explained in relation to FIGS. 2 and 3.

FIG. 6, which gives a longitudinal section of the plate spring described in the foregoing, will not need further elucidation. The same holds for FIG. 14a showing an asymmetrical plate spring.

FIGS. 7 and 8 show respectively in elevation and in longitudinal section a plate spring which is constructed with branches on two sides as already explained in relation to FIGS. 5 and 6. The reference numerals are the same as those in the previous figures.

FIG. 9 shows a double-sidedly branched plated spring in which the branched ends are bent back towards the middle of the curved part. In this case the major middle-part 28 of the bow-shaped spring portion terminates at the two ends in an edge 45 and 35 respectively. The branched spring parts 36, 37, 38 and 39 extend along the side of part 28 for some distance beyond the latter. In this way four slots 40, 41, 42 and 43 are formed which are provided at their ends with enlarged openings 44 to 47 inclusive. With this construction a particularly advantageous flow characteristic is obtained, as a flow reaching the bottom edge 35 according to arrow 52 will branch off freely into two separate cooling flow paths 53 and 54 (see FIG. 10, in which a longitudinal section of the spring is illustrated). At the same time, aperture 44 to 47 and 40 to 43 afford ample opportunity for inflow and outflow of the cooling medium.

FIG. 11 shows a series of springs 30 of the type illustrated in FIGS. 5-6. A series of springs of this kind is suitable for use with liquid sodium (and other liquid metals of this kind) as cooling medium.

All plate springs described in the foregoing may be fixed to the bands of the grid by means of suitable formed counterplates, which in a sandwich construction are spotwelded to the springs through holes in the grid bands. This construction gives added strongness, (compare the remarks made hereafter in relation to FIG. 13-14) and allows the use of materials that otherwise could not be connected by spotwelding.

FIG. 11a shows a variant of the series depicted in FIG. 11. In this variant, two plate springs of type 30, close in between them a spring of type 15. According to another execution it is possible to change the construction of FIG. 11, wherein a number of separate plate springs were spotwelded to a common base, to a construction in which these elements are integrated to one single strip, in which the base is incorporated.

FIG. 12 shows how a series of springs can be accommodated in this way by stamping them out in one strip 55. Parts 56, 57, 58 and 59 are stamped out of the original strip. The spring parts 60, 61 and 62 are arched. Parts 63 are curved. Parts 64 are bulged. Numeral 65 denotes fixing points.

Springs strips like these offer several advantages. The mass production is cheaper. Spot-welds may be placed in other places of the strip (not shown). The spring load is shared by a number of springs in succession, hence the spring tension may be held at a correspondingly low value. This is important for high-temperature applications. Moreover: the construction is now independent of high-temperature distortion that may gradually develop in the band material of the grid. FIG. 12a gives a longitudinal sectional view along A-B-C-D, of FIG. 12 to elucidate this construction.

If a square array of fuel rods is envisaged, a simple, inexpensive solution is obtained by the construction shown in FIG. 13.

Here straps 66 and 67 are interconnected by short stringers 68 and 69. The connections are obtained by spot-welds 70, 71, 72 and 73.

Plate springs 74 and 75 are shown to be fixed to the stringers 68 respectively 69. These springs may be of the type depicted in FIG. 2 as spring 8, or in the FIGS. 3-4 as spring 15-16. Rod support elements 76 and 77 are provided, to give a stiff support in the points 78 and 79 to a fuel rod 80. FIG. 14 gives a front view of rod support element 77. To obtain the rigid support, clips are bent in the form 81 en 82. The clips are the opposite ends of a beam 83 of the crosslike element 77. The other beam 85 is used to make spot-welds in the places 86 and 87.

Usually, the material for the straps 66, 67 and the stringers 68, 69 will consist of zircaloy. The spot-welds 70-73 between the zircaloy itself will offer no difficulty, provided these are degreased and pickled beforehand and handled by the operators with gloves, as described in more detail hereafter. The fabrication of a spacer unit will in practice comprise the following steps:

The zircaloy pieces constituting the frame are shaped and bended and subsequently degreased and pickled in a standard zircaloy HNO$_3$-HF solution. The object of this is to clean the surfaces of the parts before the stress relieving treatment for 10-25 hrs. at temperatures of between 500° and 550° C. in high vacuum. Such a treatment before assembly is necessary because the zircaloy ductility at the corners will be practically exhausted by the bending operation. Moreover the angle of bending would otherwise certainly deflect from 90° at the spacer operating temperature because of relexation. Therefore a preliminary stress relief will prevent undue changes in geometry taking place during service at operating temperature. If after the vacuum heat treatment the pieces are not quite in the right shape, a post-heat treatment shaping to the correct sizes may be necessary. Before welding the pieces have to be cleaned again, but this time after degreasing a flash HNO$_3$ pickle without HF will generally by sufficient.

After the last cleaning treatment the pieces are to be handled only with nylon gloves. After this, the parts may be put together in a (preferably brass) jig, by means of which they are secured in the exact position for welding. Prior to spotwelding the overlap joints, these must be sprayed by a liquid that will evaporate quickly under influence of the heat developed by the welding current, flashing in vapor, that by its expanding action will remove the air from the gaps between the overlap welds. The joints are finally welded. For this liquid a volatile liquid may be used, preferentially a pure organic compound free of sulfur, fluorine, chlorine and iodine, such as acetone or aethenol, whereby the rapid evaporation of the volatile liquid prevents that the deleterious effects of nitrogen or oxygen absorption in the weld zone on the spot-welding tightness occurs. By these measures, the occurrence of white oxide rings around the spot-welds can be entirely eliminated. The materials zircaloy and inconel mentioned hereafter may be defined as follows.

Zircaloy in this application refers to a zirconium alloy, used as a structural reactor material, containing 2½ percent niobium.

Inconel is a nickel base alloy of the type containing 13 percent chromium and 6.5 percent iron such as the structural reactor material obtainable under the designation Inconel X 750 or Inconel 718.

For the material of the plate springs in many cases inconel has proven the most reliable. Because it is not possible to weld strips of zircaloy and inconel together, as the weld would consist of a brittle eutect, another solution is followed here. At the places in the stringers 68 and 69 corresponding with the locations 86 and 87 on element 77 where the spot-welds are designed to be provided, are made small holes. By spotwelding through these holes, a strong connection is obtained between the parts 74 and 76 respectively 75 and 77. If deemed necessary, one of these parts may be bulched through a hole, until it makes contact with the other part, prior to welding. This serves not only to fix these parts to the stringers 68, 69 but also to give an added certainty that the plate springs 74, 75 will hold the required resilience.

For a lasting nonlinear spring characteristic it is namely necessary that the outward ends of each plate spring remain at the same distance from each other, to ensure that the spring tension is sustained.

Some grid materials, such as zircaloy, show a certain weakness at high temperature. Other grid materials might show creep effects. The use of the counterplate 77 gives a protection against these unwanted effects.

In some cases it may be economic, to bend rigid support clips 84, 89 from the stringer bands 88, 90, see FIG. 15. At the places 91-98 are spot-welds. The sandwich spot-weld is again used to fix the plate springs 99, 100 to the stringers 88, 90. The counterplates 101, 102 are now of simple rectangular form (see the front view of plate 101 in FIG. 16). In FIG. 17 is a modification shown, wherein it is possible to employ a so-called egg crate construction, in which the grid is built up out of crosswise connected straps 103, 105 respectively 104, 106.

An exploded detail view gives in FIG. 18 an insight in a construction that may be employed. Slits 107-110 are provided in the straps, to interlock these straps completely.

Moreover, fingers 111-117 are stamped and bent out off the upper edge 118 of strap 103, or out off the lower edge 119 of strap 106.

The fingers ensure the required rigid support for the rod or tube denoted by 80.

At the same time these fingers may be used to fix the eggcrate straps together by spot-welds at the locations 120–127. The plate springs 99, 100 are fastened as described with relation to FIG. 15.

Having thus disclosed our invention, what we claim is:

1. A spacer grid for holding against lateral displacement a plurality of solid elements which take part in a heat exchange process, said grid being assembled from band material so as to form a plurality of compartments arranged with their axes parallel with each other, each compartment having a sidewall; and a plate spring having a characteristic that the spring force does not increase after a given amount of compression extending longitudinally at least at one position in each of said compartments, said plate spring when in the released state having a bow-shaped bend in one direction in its major middle part for engagement with the respective element, the extreme ends of said plate spring being in rigid connection with fixed points on the sidewall of the respective compartment while between at least one of said fixed points and said bow-shaped bend a smaller portion of the plate spring is arched in the same direction as said bow-shaped bend wherein said plate spring is provided with at least one passage aperture transverse to the surface of said compartment sidewall.

2. A spacer grid as in claim 1 wherein said aperture is formed by a branching of an arched portion the branched parts closing again together after the aperture.

3. A spacer grid as in claim 1 wherein said aperture is defined by a perforation of a locally widened section of one of said arched portions of said plate spring.

4. A spacer grid for holding against lateral displacement a plurality of solid elements which take part in a heat exchange process, said grid being assembled from band material so as to form a plurality of compartments arranged with their axes parallel with each other, each compartment having a sidewall; and a plate spring having a characteristic that the spring force does not increase after a given amount of compression extending longitudinally at least at one position in each of said compartments, said plate spring when in the released state having a bow-shaped bend in one direction in its major middle part for engagement with the respective element, the extreme ends of said plate spring being in rigid connection with fixed points on the sidewall of the respective compartment while between at least one of said fixed points and said bow-shaped bend a smaller portion of the plate spring is arched in the same direction as said bow-shaped bend at least one end of said plate spring being formed in at least two longitudinally extending branched parts.

5. A spacer grid as in claim 4 wherein said branched parts originate from and include a part of said bow-shaped bend.

6. A spacer grid as in claim 4 wherein said branched parts originate at the extremities of said bow-shaped bend and are folded so as to lie between the respective sidewall and said bow-shaped bend and so as to be directed toward the middle of said plate spring.

7. A spacer grid as in claim 4 wherein said plate springs are branched only at one end and a plurality of said plate springs are arranged longitudinally in each of said compartments such that the unbranched end of each spring is situated between the branch parts of the adjacent spring.

8. A spacer grid as in claim 4 wherein said plate spring includes a plurality of longitudinally spaced-apart bow-shaped bends alternating with a plurality of longitudinally spaced-apart arches, said spring being a single plate having portions thereof punched out to define the portions having the bends and arches.

9. A spacer grid for holding a plurality of rodlike elements against lateral displacement comprising:

a plurality of parallel spaced-apart straps interconnected by a plurality of parallel transversely extending stringers so as to define a plurality of compartments each of which is adapted to receive one of the rodlike elements; a cross-shaped rod support element in each compartment, one beam of the cross having its opposite ends bent so as to form stiff clips extending into the compartment for engagement with the rodlike element, the other beam of the cross extending longitudinally of the compartment and being in engagement with one of said stringers; a plate spring disposed in engagement with the opposite side of that stringer which is engaged by said rod support element, said stringer having at least one aperture therethrough at the location of said plate spring and said rod support element; and a spot-weld between said spring and said rod support element at the location of said aperture in said stringer.

10. A spacer grid for holding a plurality of rodlike elements against lateral displacement comprising:

a plurality of straps each having longitudinally spaced-apart transversely extending slits therein, said straps being arranged in grid form in the manner of an egg crate, the material of said straps between the slits being bent to form stiff clips projecting into the meshes of the grid; and a spring attached in each mesh in a location opposite the location of said clips said spring having such a characteristic that following a given compression of the spring, the spring force does not increase.

* * * * *